US009346107B1

(12) United States Patent
Block

(10) Patent No.: US 9,346,107 B1
(45) Date of Patent: *May 24, 2016

(54) DRILL BIT JIG

(76) Inventor: Michael Block, Phoenix, AZ (US)

( * ) Notice: Subject to any disclaimer, the term of this patent is extended or adjusted under 35 U.S.C. 154(b) by 880 days.

This patent is subject to a terminal disclaimer.

(21) Appl. No.: 13/415,680

(22) Filed: Mar. 8, 2012

Related U.S. Application Data

(63) Continuation-in-part of application No. 12/650,987, filed on Dec. 31, 2009, now Pat. No. 8,757,939, which is a continuation-in-part of application No. 11/852,109, filed on Sep. 7, 2007, now Pat. No. 8,152,420.

(60) Provisional application No. 61/450,501, filed on Mar. 8, 2011, provisional application No. 60/843,245, filed on Sep. 7, 2006.

(51) Int. Cl.
*B23B 47/28* (2006.01)

(52) U.S. Cl.
CPC ............ *B23B 47/28* (2013.01); *B23B 47/287* (2013.01); *B23B 2247/06* (2013.01); *B23B 2247/12* (2013.01); *Y10T 408/563* (2015.01); *Y10T 408/567* (2015.01)

(58) Field of Classification Search
CPC ............ Y10T 408/567; B23B 47/287; B23B 2247/12
USPC ...... 408/115 R, 103, 97, 115 B, 72 B; 269/16, 269/22, 87.1, 87.2, 87.3, 91, 108, 118, 119, 269/147, 165, 219, 905; 33/534, 542
See application file for complete search history.

(56) References Cited

U.S. PATENT DOCUMENTS

| 310,710 | A | | 1/1885 | Nichols |
| 1,782,615 | A | | 11/1930 | Hopwood |
| 2,260,784 | A | | 10/1941 | Morton |
| 2,775,341 | A | | 12/1956 | Williams |
| 2,814,219 | A | | 11/1957 | Zern |
| 3,162,953 | A | * | 12/1964 | Porter ............................ 33/542 |

(Continued)

FOREIGN PATENT DOCUMENTS

| FR | 2669251 A1 | 5/1992 |
| GB | 2288356 A | 10/1995 |

(Continued)

OTHER PUBLICATIONS

Rockier Woodworking and Hardware, JIG IT Shelving Jig, http://www.rockler.com/product.cfm?page=5876&site=ROCKLER, Oct. 25, 2012.

*Primary Examiner* — Eric A Gates
*Assistant Examiner* — Paul M Janeski
(74) *Attorney, Agent, or Firm* — Schmeiser, Olsen & Watts LLP

(57) ABSTRACT

A drill bit jig includes an elongate member, two jig securing elements and a drill bit guide. The drill bit guide includes a plurality of through holes where the axes of the through holes are parallel to the axis of the elongate member. Each of the plurality of through holes in the drill bit guide has a different diameter for accommodating drill bits of different thicknesses. The jig securing elements each include an L-shaped bolt and a door protecting material encasing one of the straight sections of the bolt. The drill bit jig also includes a core check to determine if a hole being drilled along the width of the door is straight.

10 Claims, 16 Drawing Sheets

(56) References Cited

U.S. PATENT DOCUMENTS

| | | | | |
|---|---|---|---|---|
| 3,338,277 | A | * | 8/1967 | Tornoe et al. .................... 144/27 |
| 3,700,344 | A | | 10/1972 | Grumbach |
| 4,060,333 | A | * | 11/1977 | White ........................... 408/103 |
| 4,204,785 | A | | 5/1980 | Rowlings |
| 4,219,936 | A | * | 9/1980 | Bridges ........................... 33/534 |
| 4,474,514 | A | * | 10/1984 | Jensen ................. B23B 47/287 |
| | | | | 408/115 B |
| 4,638,566 | A | * | 1/1987 | Thompson ..................... 33/534 |
| 4,726,717 | A | | 2/1988 | Schmid |
| 4,893,970 | A | | 1/1990 | Becraft |
| 5,056,966 | A | | 10/1991 | Lee |
| 5,407,307 | A | | 4/1995 | Park |
| 5,888,035 | A | * | 3/1999 | Cutler .................... B23B 51/08 |
| | | | | 254/134.3 FT |
| 6,217,266 | B1 | | 4/2001 | Bowling |
| 6,231,034 | B1 | | 5/2001 | Walker et al. |
| 6,309,146 | B1 | | 10/2001 | Lasseter |
| 8,282,079 | B2 | * | 10/2012 | Petti ........................ H02G 1/08 |
| | | | | 254/134.3 FT |
| 2005/0178686 | A1 | | 8/2005 | Pangerc et al. |

FOREIGN PATENT DOCUMENTS

| | | |
|---|---|---|
| JP | 10217011 A | 8/1998 |
| WO | 8810177 A | 12/1988 |

* cited by examiner

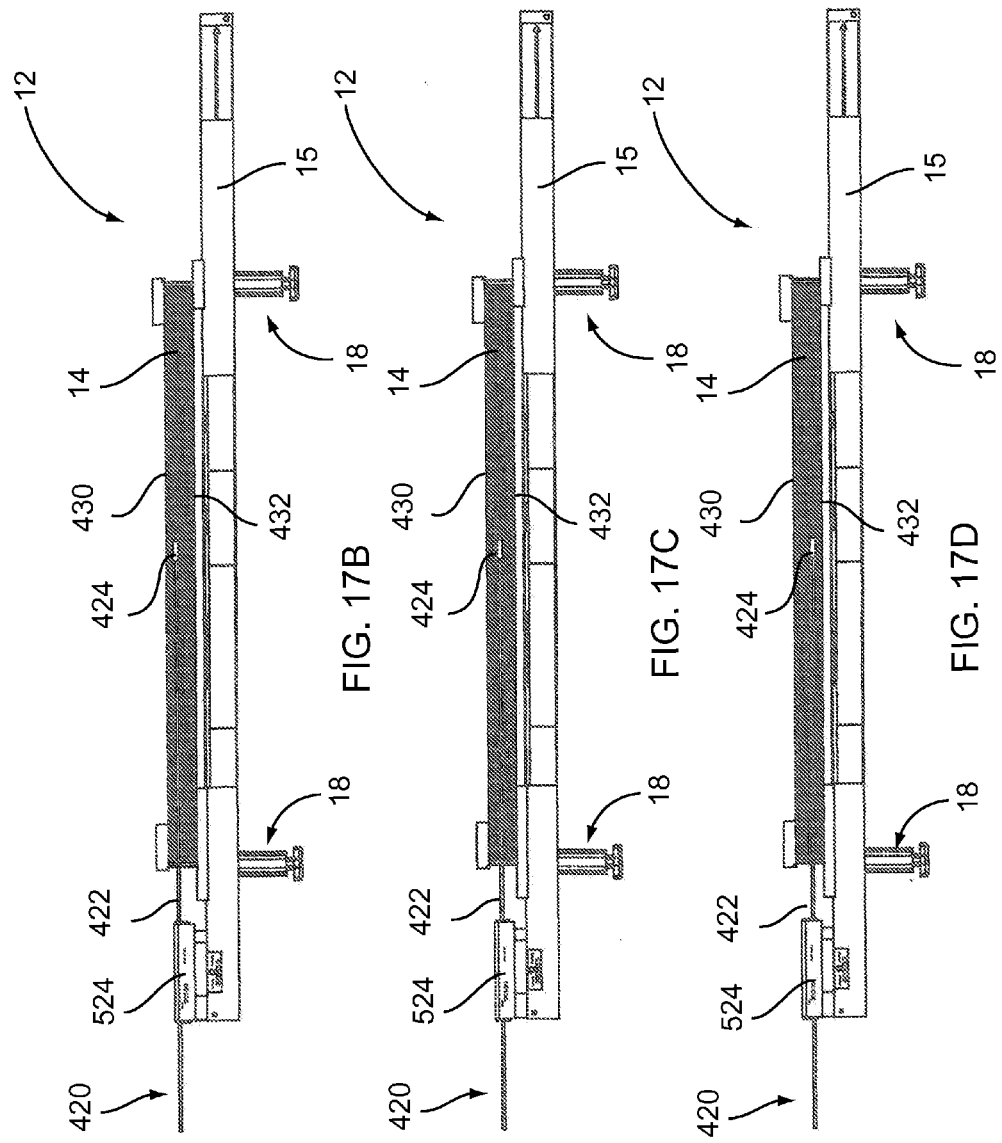

DRILL BIT JIG

CROSS REFERENCE TO RELATED APPLICATIONS

This application claims priority to U.S. Provisional Patent Application entitled "Drill Bit Jig", Ser. No. 61/450,501 filed Mar. 8, 2011, and is a continuation-in-part of earlier U.S. Utility patent application entitled "DRILL BIT JIG," Ser. No. 12/650,987, filed Dec. 31, 2009, now pending, which is a continuation-in-part of the earlier U.S. Utility patent application entitled "DRILL BIT JIG," Ser. No. 11/852,109, filed Sep. 7, 2007, now pending, which claims priority to U.S. Provisional Patent Application entitled "Drill Bit Jig", Ser. No. 60/843,245 filed Sep. 7, 2006, the disclosures of which are hereby incorporated entirely herein by reference.

BACKGROUND OF THE INVENTION

1. Technical Field

This invention generally relates to jigs and more particularly to jigs for positioning and guiding drill bits and methods for using such jigs to drill elongate holes without marring a surface of a metal work piece.

2. State of the Art

In the past, technicians installing security systems on doors have used line of sight to align a bit during hand drilling of a hole in a generally widthwise direction from a hinge area to a bolt area of a security door. Often this method of "eye-balling" has resulted in ruining or damaging the door by drilling through a front or rear surface of the door.

SUMMARY OF THE INVENTION

The present invention relates generally to jigs and more particularly to jigs for positioning and guiding drill bits during a drilling operation.

In a simple form, the present invention may include a jig having an elongate member with a longitudinal axis. The jig may also include at least one adjustable jig securing element adjustably supported on the elongate member. The jig may also include at least one rotatable drill bit guide piece protruding transversely relative to the elongate member and rotatable to account for deflection of a drill bit travelling through a door. The jig may also have structure in the bit guide piece that forms a through opening in the bit guide piece. The through opening may extend lengthwise in a direction generally parallel to the longitudinal axis of the elongate member.

The jig securing element may include an L-shaped bolt passing through the elongate member. An elbow portion and a shorter straight section of the L-configured bolt may extend transversely on a first clamping side of the elongate member while a longer straight section of the L-configured bolt may extend transversely on a second tightening side of the elongate member. At least a portion of the longer straight section may be threaded. A threaded knob or nut may be received on threads of the straight threaded portion. The threaded knob or nut may be turned in a first direction to draw the bolt through the sliding piece in a first tightening direction transverse to the longitudinal axis of the elongate member and to extend the bolt through the sliding piece in an opposite second loosening direction that is also transverse to the longitudinal axis.

The jig may include two jig securing elements substantially similar to the jig securing element described above. Thus, the elbow portion of respective jig securing elements may be engaged on opposite edges of a work piece to be drilled.

The bit guide may be incorporated into one or more blocks or plates. The block may extend transverse to the elongate member on the first clamping side of the jig. Thus, when the jig is secured to the work piece, the bit guide may be aligned so that the through hole lies in a plane of the work piece. By aligning the elongate member along a line to be drilled through the work piece, the bit guide may be placed to guide a bit through the work piece along a predetermined line during drilling. Thus, errors in drilling may be avoided.

It is to be understood that several holes of a variety of sizes and/or positions may be provided in the block that incorporates the bit guide. Thus, a user may select any of a variety of bit sizes and may drill at any of a variety of locations to accommodate different applications and different thicknesses of work pieces.

In another simple form, a method of drilling through a width of a work piece in accordance with the present invention may include aligning a jig with a desired line of drilling. The method may include securing the jig to the work piece. The method may include inserting a drill bit through a desired bit guide secured to or forming part of the jig. The method may include drilling widthwise through the work piece along the line of drilling.

The method enables drilling through the width of the work piece without accidentally penetrating a surface in a thickness direction of the work piece. The work piece may be a door having a height and a thickness in addition to a width. The line of drilling may be any transverse direction relative to a height dimension of the door. Alternatively, the jig may be used to drill in a height direction of the door. The present invention enables drilling through a width, a height, or any diagonal direction between a width and a height without penetrating through a front or a rear surface of the door. Overall, the jig of the present invention may be used to drill in any direction or any plane of the door.

The method may include aligning an elongate member in an aligned position relative to a line to be drilled on the work piece. The step of securing may include clamping the elongate member in the aligned position. The step of aligning may include aligning a through hole in the bit guide with a desired location on a thickness of the work piece to be drilled. The step of securing may include aligning a longitudinal axis of the through hole in the bit guide with a longitudinal axis of the elongate member in a generally parallel relationship. The step of aligning may include selecting a through opening from among a plurality of through holes in the bit guide and inserting a drill bit through the selected through opening. Alternatively or additionally, the step of aligning may include placing one or more spacers between the elongate member and a clamping knob of the jig securing element to accommodate work pieces of varying thicknesses.

Another embodiment of the present invention includes a drill bit jig system comprising an elongate member; a hollow metal door bit comprising a shaft body and a bit tip; two jig securing elements; and a drill bit guide having through holes for receiving the at least one drill hollow metal door bit, wherein the hollow metal door bit tip creates a starter hole in a spline of a hollow metal door in response to applying force to an end of the hollow metal door bit opposing the bit tip.

Another embodiment includes a drill bit jig system comprising an elongate member; at least one drill bit; two jig securing elements; a drill bit guide; and a guide line inscribed onto the elongate member, wherein the drill bit guide guides a drill bit through the work piece along the guide line during drilling.

Further, another embodiment includes a drill bit jig system comprising an elongate member; a drill bit; two jig securing elements coupled to the elongate member for securing the elongate member to a door; a drill bit guide having a hole for receiving the drill bit; and a core check comprising a shaft body and a probe coupled to an end of the body shaft, wherein the core check indicates whether a hole being drilled through the door by the drill bit is straight in response to operating the core check.

The foregoing and other features and advantages of the present invention will be apparent from the following more detailed description of the particular embodiments of the invention, as illustrated in the accompanying drawings.

BRIEF DESCRIPTION OF THE DRAWINGS

FIGS. 17B-17D are top views of a drill bit jig system using a core check.

DETAILED DESCRIPTION OF EMBODIMENTS OF THE INVENTION

As discussed above, embodiments of the present invention relate to jigs in general and more specifically to jigs for positioning and guiding drill bits and methods for using such jigs to drill elongate holes without marring a surface of a work piece.

Figure 1A:
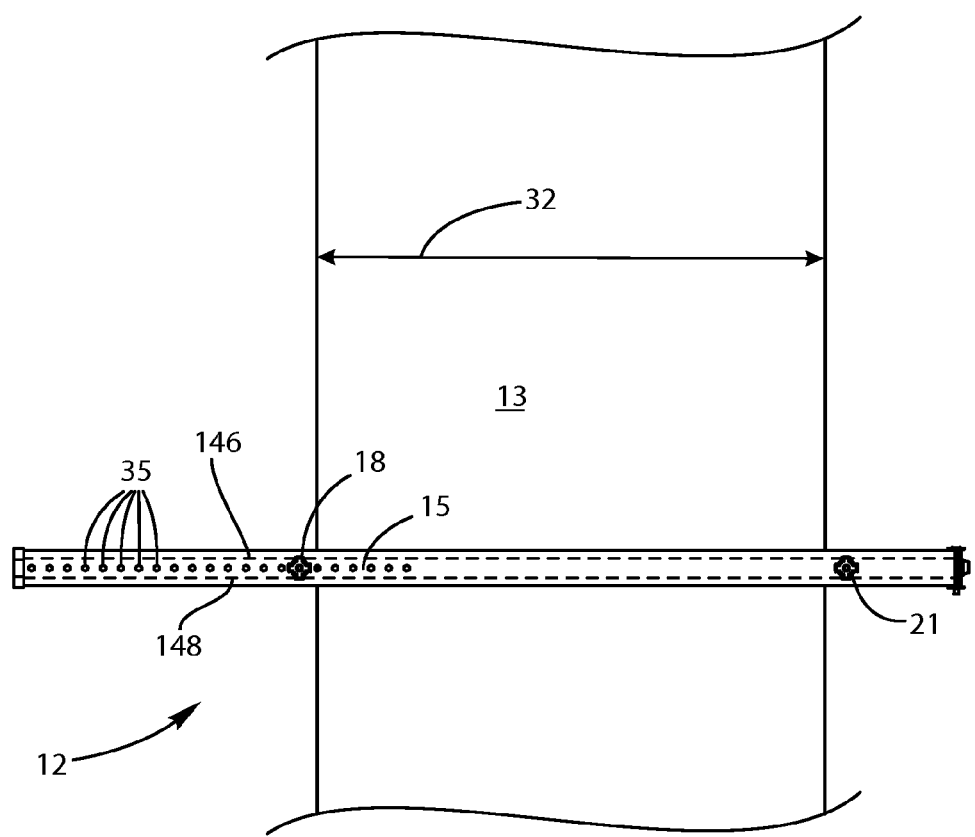
FIG. 1A is a front elevation view of a jig, in accordance with the present invention.
Figure 1B:
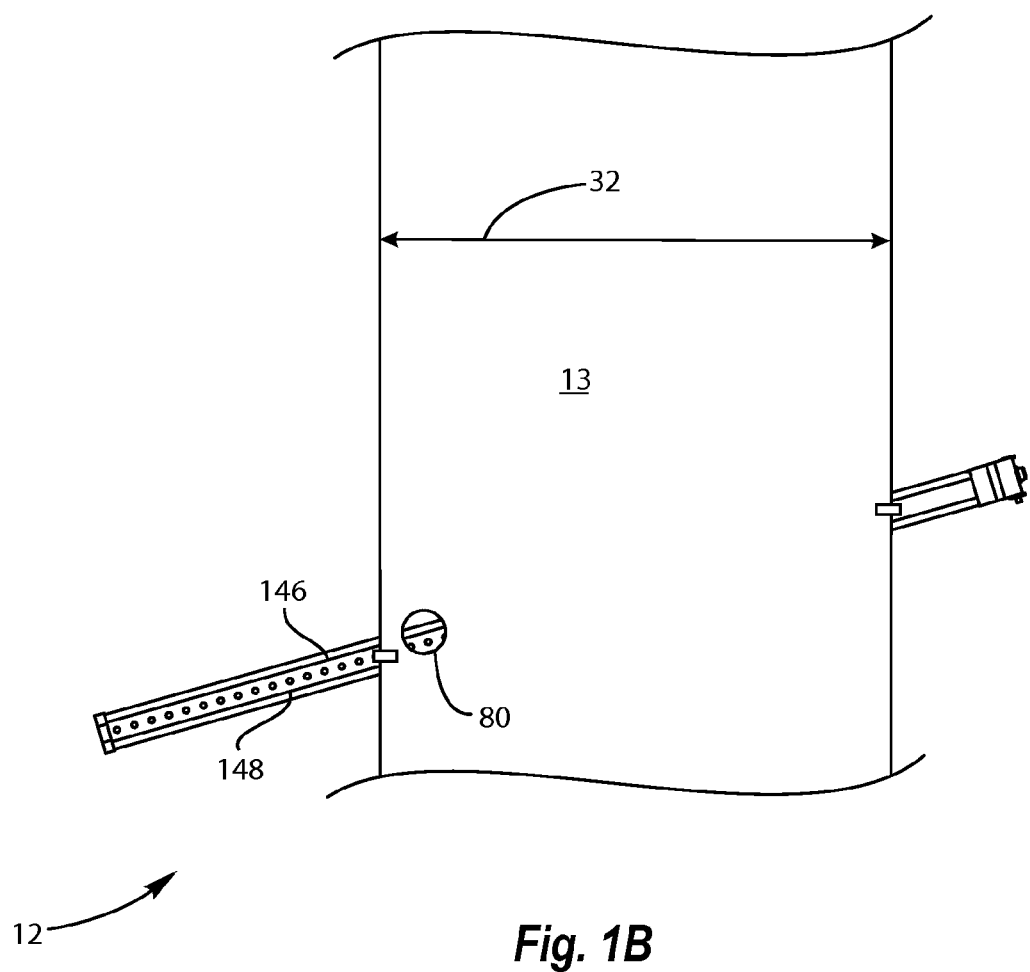
FIG. 1B is a rear elevation view of a jig, in accordance with the present invention.
Figure 2:
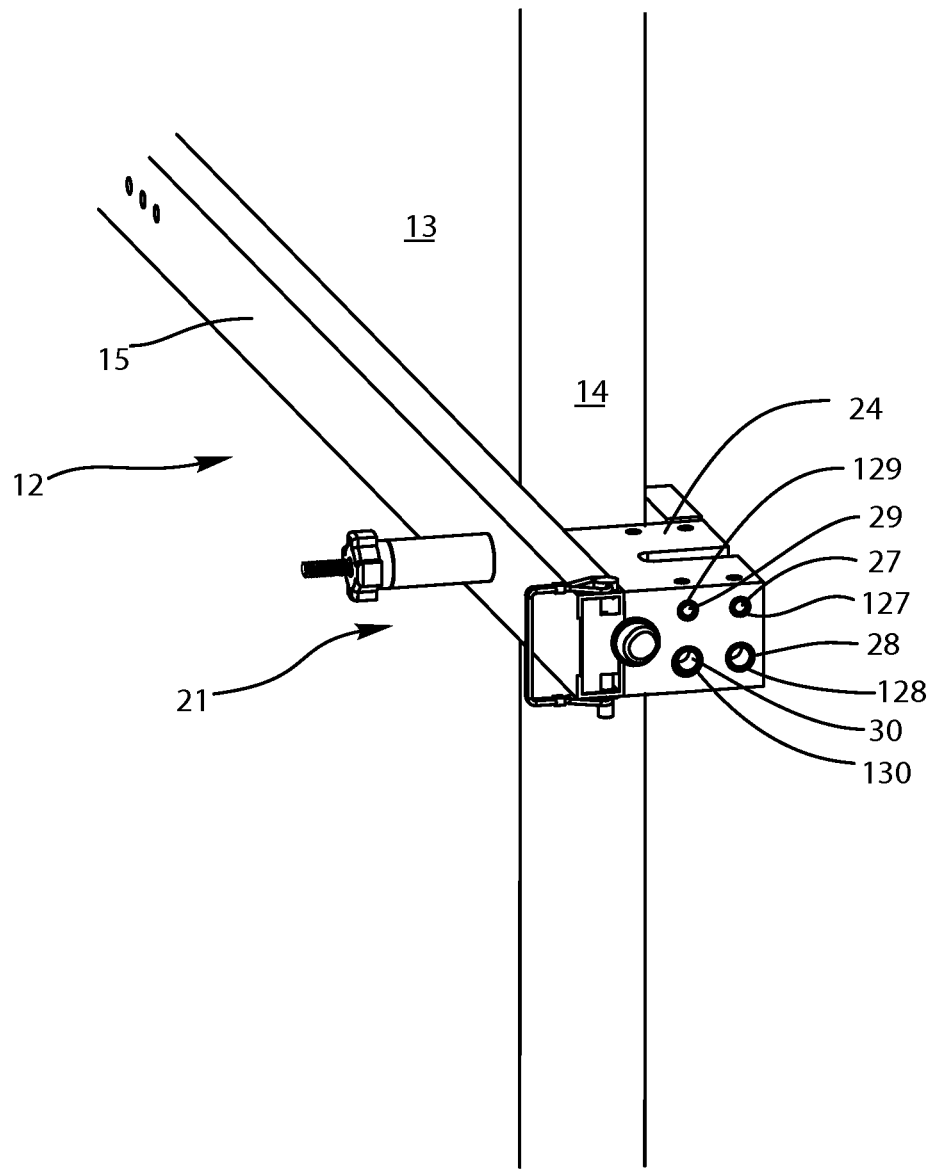
FIG. 2 is a perspective view of a first end of the jig and a drill bit guide, in accordance with the present invention.
Figure 3:
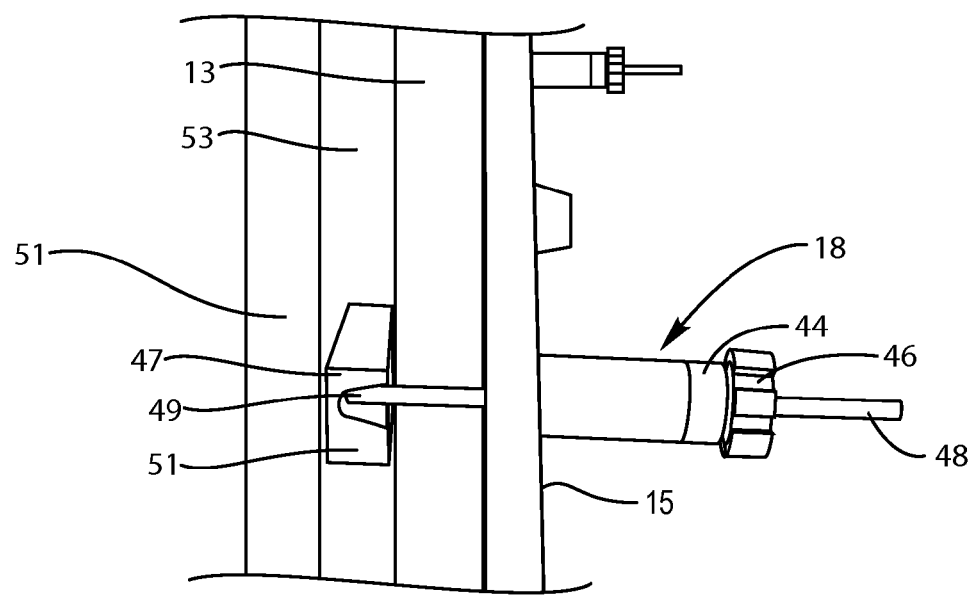
FIG. 3 is a perspective view of a second end of the jig, in accordance with the present invention.

FIGS. 1-3 show a jig 12 secured to a door 13. The jig 12 includes an elongate member 15, two jig securing elements 18 and 21, and a bit guide 24. In practice, the knob 80 and a hinge (not shown) would be removed and the elongate member 15 would be aligned with the opening in the door 13 that receives the knob 80. Then a hole would be drilled in a generally widthwise direction from the knob area to the hinge mounting area. Then wiring for carrying security signals could be placed in the hole.

At least one of the jig securing elements 18, 21 is adjustable along a length of the elongate member 15. In a particular embodiment, shown in FIG. 1, jig securing element 18 is adjustable along the length of the elongate member 15 by providing a plurality of through holes 35 in the elongate member 15. In this embodiment, the jig securing element 18 may be positioned in any one of the plurality of through holes 35 to accommodate doors of different widths. Alternatively, the jig securing element 18 may be adjustable by, for example and without limitation, replacing the through holes 35 with an elongate channel such that the jig securing element 18 may slide along the channel, or providing a jig securing element that surrounds the elongate member 15 and is thus slidable along the outside of the elongate member 15. In a still further example, either one or both of the jig securing elements 18 and 21 may be adjustable using any of the configurations discussed above at one or both ends of the elongate member 15.

FIG. 2 depicts the jig securing element 21 that is proximate to the bit guide 24. The bit guide 24 is shown extending transversely from the elongate member 15 and positioned in alignment with the thickness aspect 14 of the door 13. The drill bit guide 24 may be rigidly attached to the elongate member 15 using any effective attachment means. For example and without limitation, the drill bit guide 24 may be attached to the elongate member 15 by screws, bolts, welding, adhesive, etc. The through openings 27, 28, 29 and 30 that form part of the bit guide 24 have longitudinal axes that are aligned parallel to a longitudinal axis of the elongate member 15. Thus, when a bit is guided through one of the openings 27, 28, 29 and 30 in the bit guide 24 and drilled through the door 13, the bit can remain aligned in a plane generally parallel to the door 13 and avoid damage or ruin to the door 13 by the bit coming out through the front or rear face of the door 13 in a thickness direction.

Figure 6:
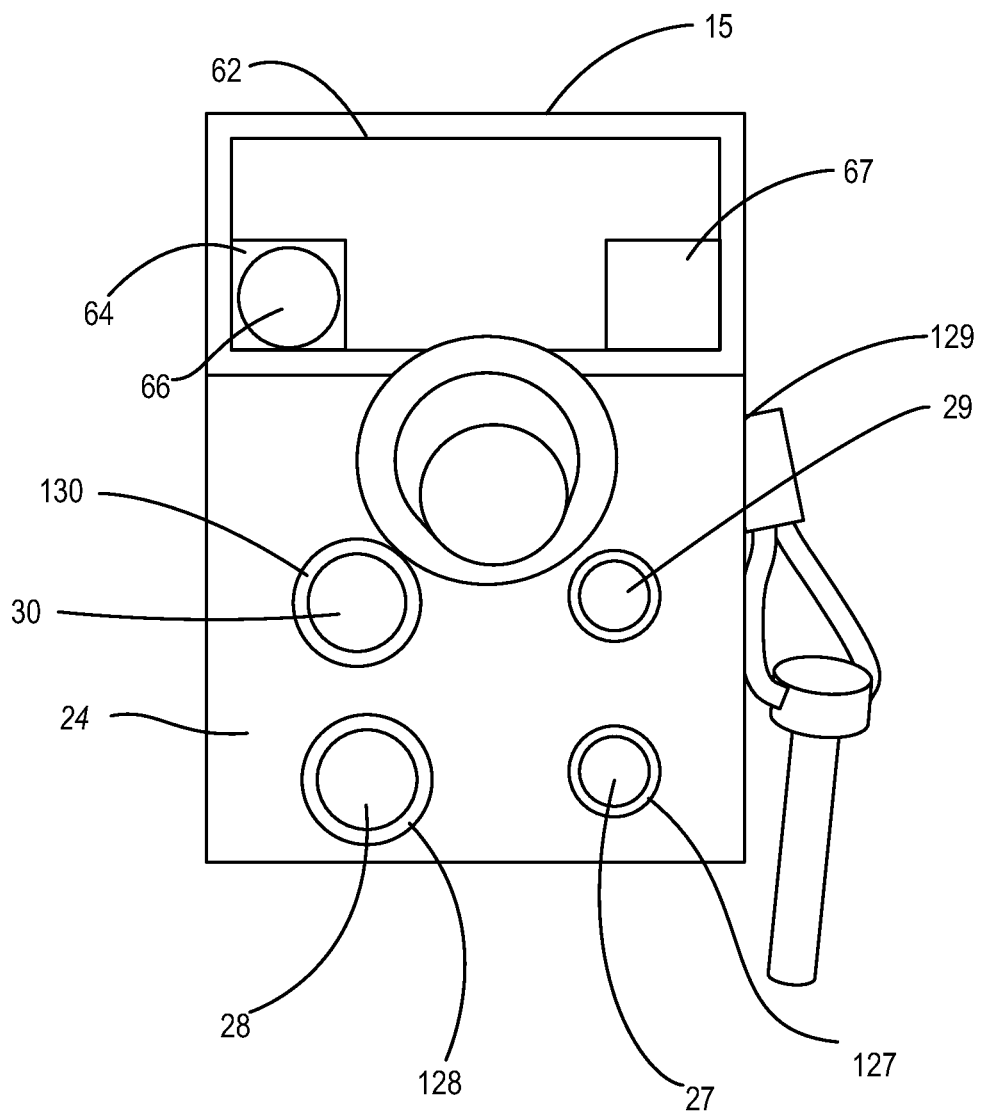
FIG. 6 is a side elevational view the first end of the jig, in accordance with the present invention.

As shown in FIGS. 2 and 6, the through openings 27, 28, 29 and 30 may have bushings or liners 127, 128, 129 and 130 to protect the through holes 27, 28, 29 and 30 against premature wear. Also, the bushings 127, 128, 129 and 130 may advantageously provide reduced friction between the bits and the jig 12 during drilling.

In the particular embodiment shown in FIG. 2, there are two sets of through openings in the bit guide 24 and each set includes two through openings with different diameters to accommodate two different sizes of drill bits. Through openings 27 and 28 are a first set of openings and through openings 29 and 30 are a second set of through openings, where through openings 27 and 29 have smaller diameters than through openings 28 and 30. Through openings 27 and 29 have substantially equal diameters and through openings 28 and 30 have substantially equal diameters. Thus, depending on the thickness of the door, a user can choose where to position the hole to be drilled by choosing one of the sets of through openings. Thus, the drill bit guide 24 can accommodate drill bits of a variety of sizes. Specifically, the drill bit guide 24 can accommodate drill bits with outer diameters that are slightly smaller than the inner diameters of the through openings 27, 28, 29 and 30. It should be noted that the drill bit guide 24 may have more or less than two sets of through openings and that each set may include more or less than two through openings. For example, the drill bit guide 24 may include three sets of through openings with three through openings in each set.

Figure 4:
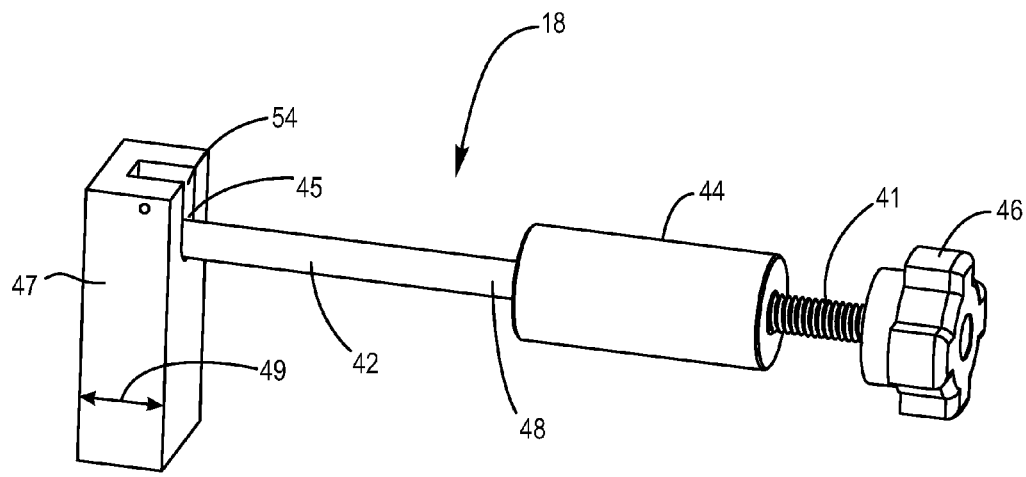
FIG. 4 is a perspective view of a jig securing element, in accordance with the present invention.

FIG. 4 is a detailed view of the jig securing element 18. It should be understood that the jig securing element 21 is substantially identical to jig securing element 18. The jig securing element 18 includes an L-shaped bolt 42 with an elbow portion 45, a longer straight section 48 and a shorter straight section encased by a door protecting material 47. At least part of the longer straight section 48 may have threads 41 that receive a clamping knob 46. The jig securing element 18 further includes a spacer 44 to accommodate different work piece thicknesses and to ensure that the threaded portion 41 of the bolt 42 does not pass through the holes 35 and 36 (shown in FIG. 7) in the elongate member 15 during clamping.

Figure 5:
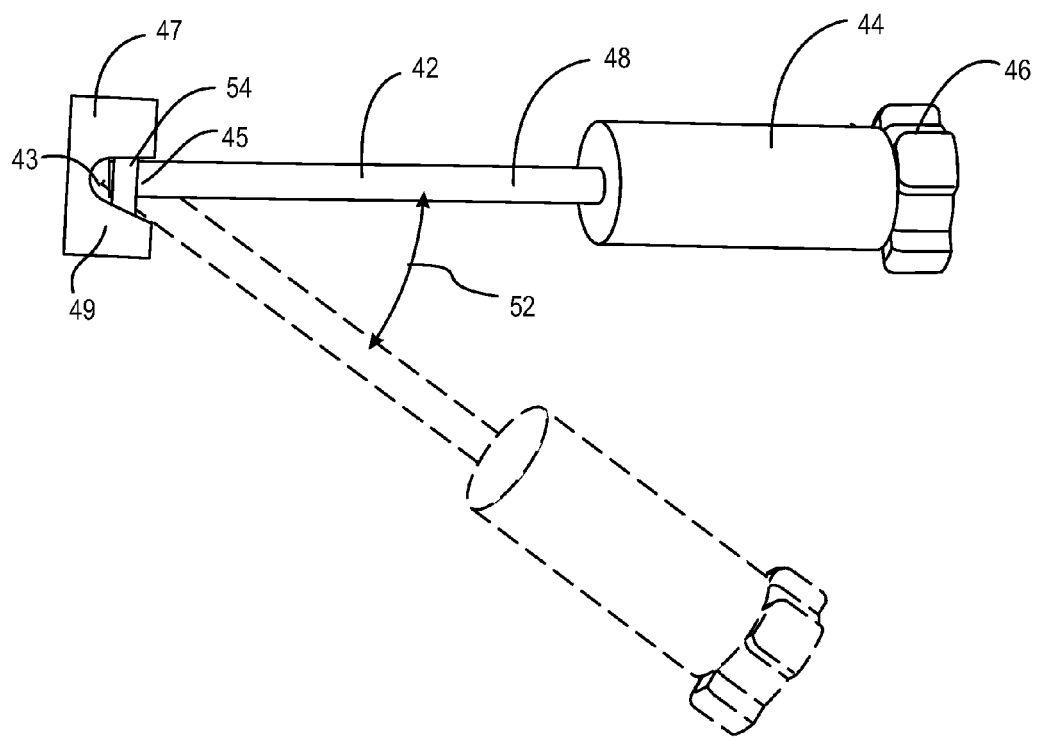
FIG. 5 is a top plan view of the jig securing element, in accordance with the present invention.

The material 47 may be generally rectangular and may be made of, for example and without limitation, plastic, UHMW plastic, polyethylene, wood, vinyl, polymer or any other material that will not cause damage to the surface of the door 13 during clamping engagement of the jig 12 on the door 13. In an alternative embodiment, the jig securing elements 18 and 21 may be provided without the door protecting material so that the shorter straight section of the L-shaped bolt 42 is in direct contact with the surface of the door when the jig 12 is in the clamped position. In the embodiment shown in FIGS. 4 and 5, the L-shaped bolt 42 is slightly pivotable within the protecting material 47 because an opening 43 in which the shorter straight section is disposed is larger than the diameter of the bolt 42. A bar 54 retains the bolt 42 within the protecting material 47. FIG. 5 is a top plan view showing the angle 52 through which the bolt 42 may pivot. As shown in FIG. 3, the thickness 49 of the protecting material 47 is such that the generally rectangular piece of protecting material 47 may fit in the opening 53 between the door 13 and the door jamb 51.

Referring again to FIGS. 1-3, the jig 12 is secured to the door 13 by positioning the jig securing elements 18 and 21 in through holes in the elongate member 15. Specifically, the long portion 48 of the L-shaped bolt 42 of jig securing element 18 passes through one of the plurality of through holes 35 disposed in one end the elongate member 15 and the long portion 48 of the L-shaped bolt 42 of jig securing element 21 passes through a through hole 36 (see FIG. 7) in the other end of the elongate member 15. The one of the plurality of through holes 35 through which the jig securing element 18 passes is chosen based on the width of the door 13 to be drilled. Thus, the jig 12 may be adjusted to be fittingly secured to doors having any of a variety of widths generally corresponding to a dimension 32. The elongate member 15 is in contact with a first surface of the door 13. The protecting material 47 and the shorter straight sections of the L-shaped bolts 42 encased therein are in contact with a second surface of the door 13. The position of the jig 12 is maintained by tightening the clamping knobs 46 on the threaded sections 48 of the bolts 42 of the jig securing elements 18 and 21 such that the door 13 and the elongate member 15 are clamped between the protecting material 47 and the spacers 44. Due to the length of the threaded section 41 and the spacer 44, the jig 12 may be adjusted to be fittingly secured to doors having any of a variety of thicknesses generally corresponding to a dimension 14.

As may be appreciated, the elongate member 15 may be formed of a generally hollow rectangular member that includes a plurality of through holes 35 and 36 (shown in FIG. 7) extending through the elongate member 15 in a direction that is transverse to the longitudinal axis of the elongate member 15. In a particular embodiment, the hollow rectangular member may be configured to support one or more bits within the jig 12. In another particular embodiment, shown in FIG. 6, the hollow member is filled with a protective filling material 62 that includes holes 64 therein for containing the bits 66. In the embodiment shown in FIG. 6, there are two holes 64, but it should be understood that the material 62 may contain more or less holes of varying sizes, depending on the number and size of the bits. Thus, a user may have an option for bit sizes and may enjoy the convenience of having the bits 66 kept together with the jig 12. Furthermore, the bits 66 are protected from any marring and users are protected from injury by the bits 66. The bits 66 used in widthwise drilling applications must be free from damage on the bit tips in order to be capable of drilling an entire width without deviating and coming out through a front or rear surface of the door in a thickness direction.

Figure 7:
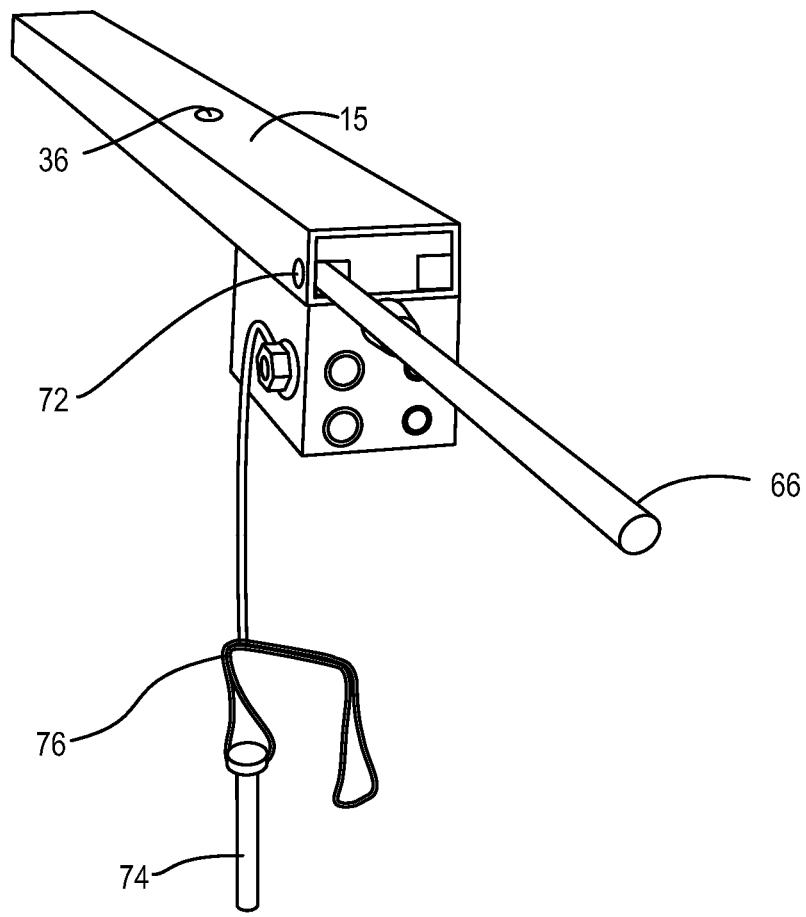
FIG. 7 is a perspective view of the first end of the jig with a bit partially removed, in accordance with the present invention.
Figure 8:
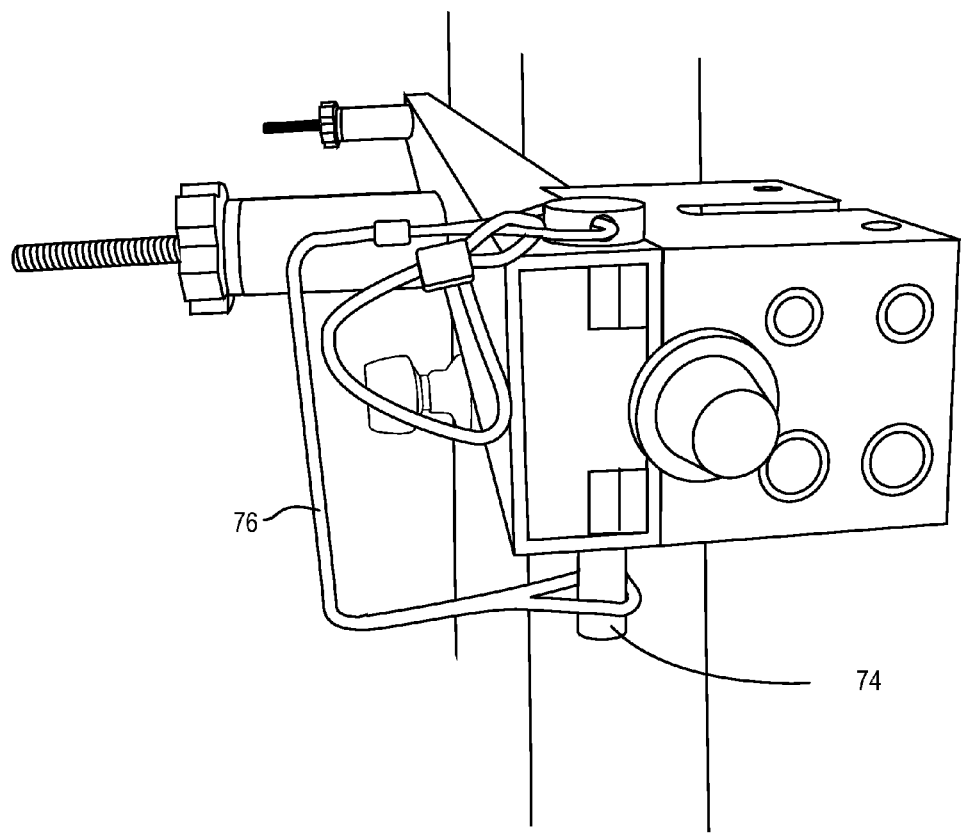
FIG. 8 is a perspective view of the first end of the jig with a locking pin in place, in accordance with the present invention.

FIG. 7 shows the bit 66 in a partially protracted state relative to the stowed condition when completely inside the elongate member 15. In order to maintain the bits 66 within the elongate member 15 during storage and/or transport, a pin 74 is positioned within the through hole 72. After positioning the pin 74 in the through hole 72, the pin 74 may be locked in place with locking mechanism 76 as shown in FIG. 8. It should be understood that the pin 74 and locking mechanism 76 are provided as examples, but any other effective configuration could be used to maintain the position of the bit 66 within the elongate member 15 during storage.

Figure 9:
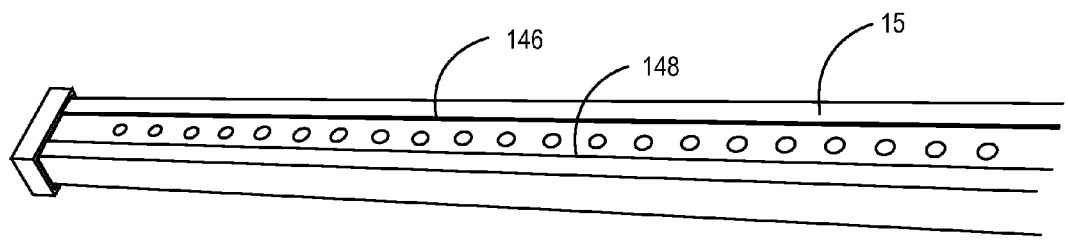
FIG. 9 is a perspective view of a back side of the second end of the jig, in accordance with the present invention.

As shown in FIG. 9, guide lines or scores 146 and 148 may be inscribed or scored onto the elongate member 15 on the end of the elongate member 15 that is distal from the bit guide 24. The guide lines are in alignment with respective through openings 27, 28, 29 and 30 in the bit guide 24. Similar lines or scores may be placed on an opposite lateral face of the elongate member 15 for sighting from that side by a user during positioning of the jig 12 on a door. However, since the elongate member 15 will generally extend beyond the widthwise edges of the door, the scores or lines shown in FIG. 9 may be sufficient.

Figure 10:
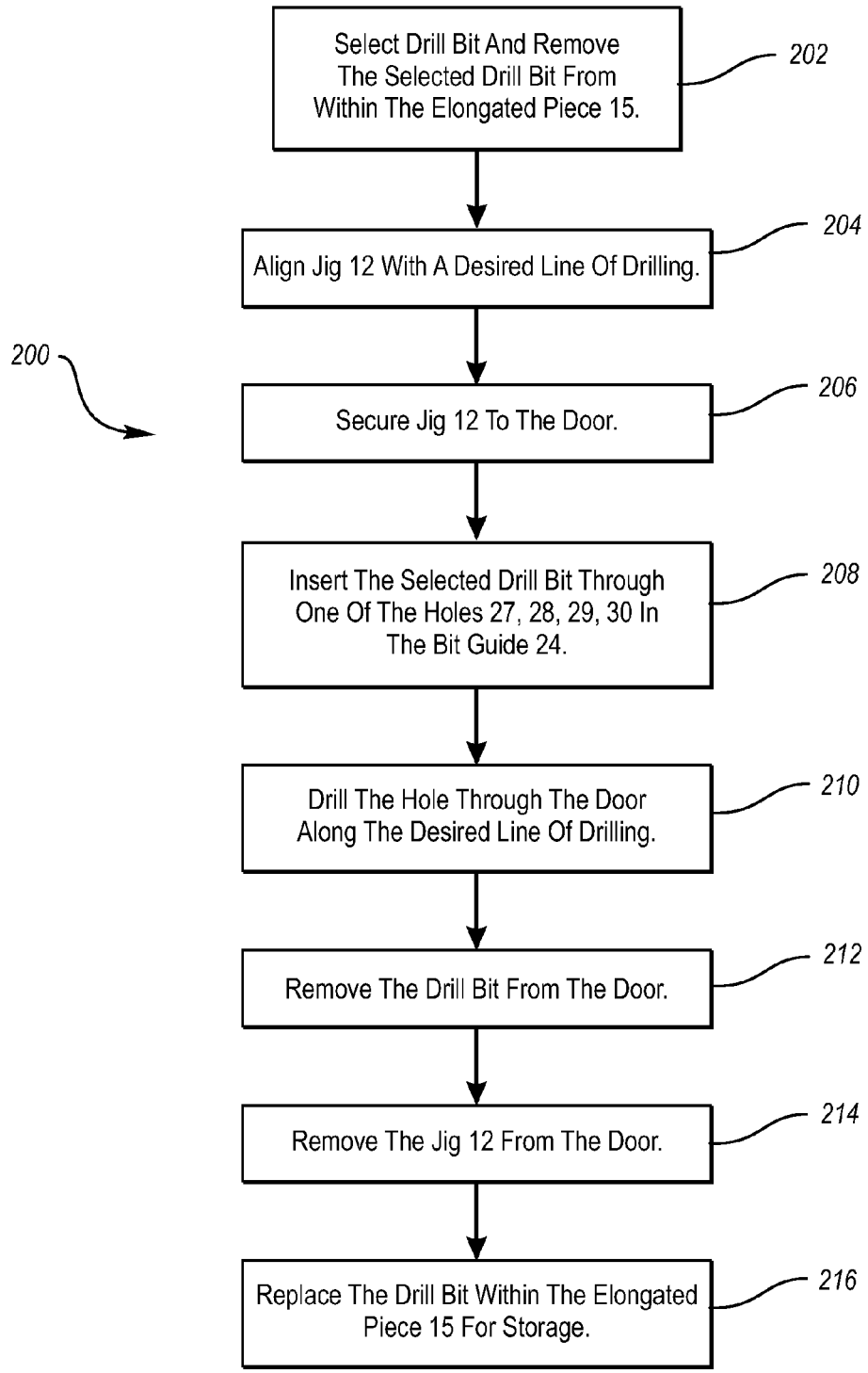
FIG. 10 is a flow chart illustrating a method of using the jig, in accordance with the present invention.

As shown in FIG. 10, a method 200 of using the jig 12 to drill a hole in a widthwise direction through a door includes step 202 of selecting a drill bit and removing the drill bit from within the elongate member 15 of the jig 12. Step 204 includes aligning the jig 12 with a desired line of drilling. Next, in step 206, the jig 12 is secured to the door. The step 206 of securing the jig 12 to the door includes inserting the jig securing elements 18 and 21 into through holes 35 and 36 in the elongate member 15 and turning a clamping knob 46 in a tightening direction so that the jig 12 is clampingly secured to the door. Then, the drill bit is inserted through one of the holes 27, 28, 29 and 30 in the bit guide 24 in step 208. In step 210, the hole is drilled through the door along the desired line of drilling. In step 212, the drill bit is removed from the door. In step 214, the jig 12 is removed from the door. The step 214 of removing the jig 12 from the door further includes turning the clamping knobs 46 of the jig securing elements 18 and 21 in a loosening direction and removing the jig securing elements 18 and 21 from the through holes 35 and 36 in the elongate member 15. Finally, in step 216, the drill bit is placed within the elongate member 15 of the jig 12 for storage.

The elongate member 15 is shown and described generally as being long in a direction corresponding to a width of a door. However, the elongate member 15 may be replaced by any member that may or may not be elongate. The member may be elongate in a direction other than the width of the door to which the jig is to be attached. The member need only have an aspect that may be aligned with a line to be drilled for perception by the user. For example, an inscribed line or score line on a member formed of sheet material could function in the same way and enable a user to align the through openings of the bit guide with the line.

Figure 11A:
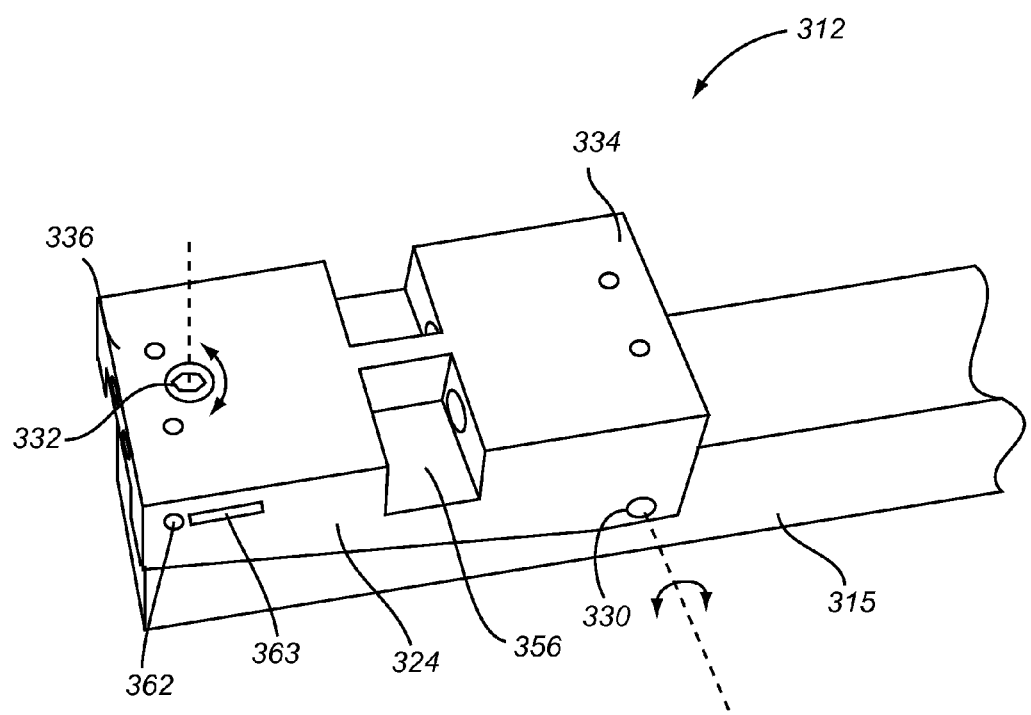
FIG. 11A is a perspective view of another embodiment of a drill bit jig in accordance with the present invention.
Figure 11B:
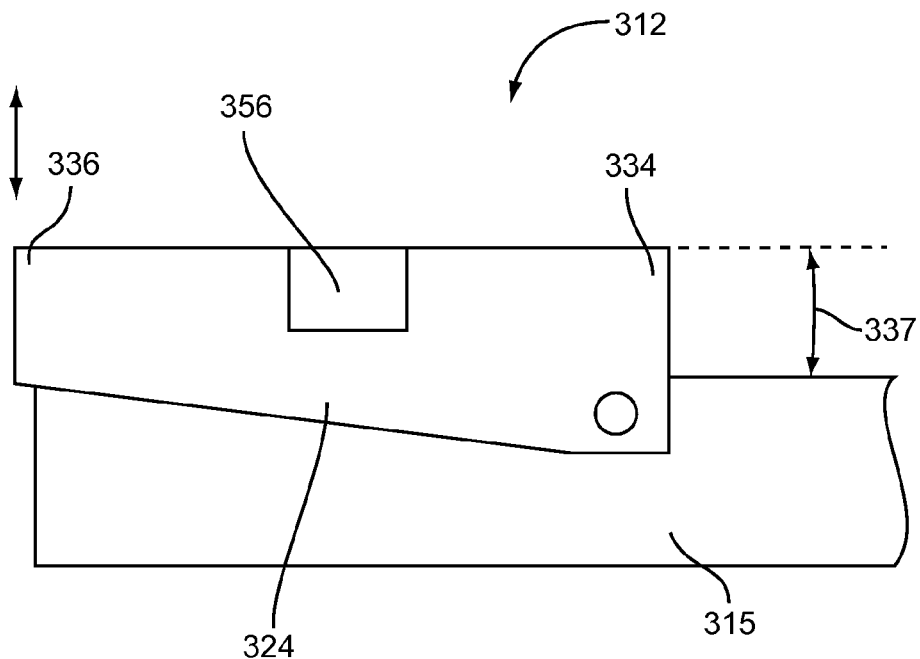
FIG. 11B is a side view of the jig of FIG. 11A.
Figure 11C:
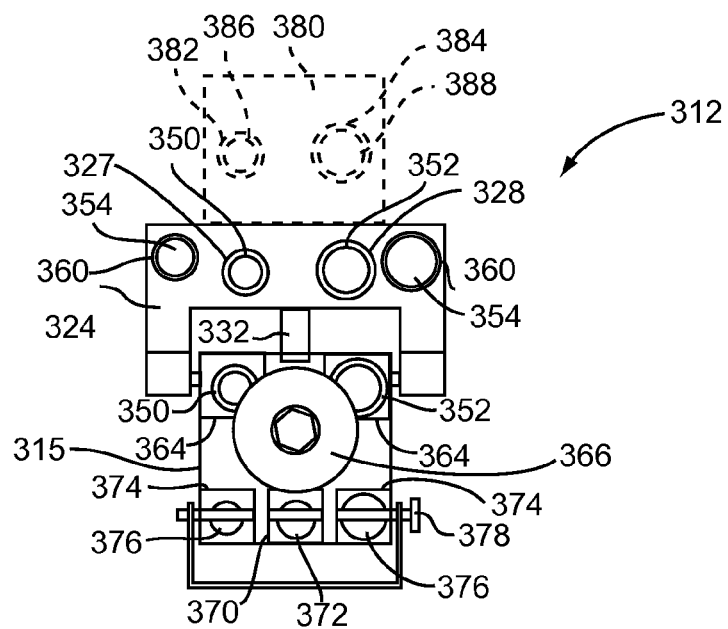
FIG. 11C is an end view of the jig of FIG. 11A.

Referring to the drawings again, FIGS. 11A-C depict a jig 312 in accordance with particular embodiments of the present invention. The jig 312 includes an elongate member 315, two jig securing elements (not shown but similar to securing elements 18 and 21 discussed above), and a rotatable bit guide 324. In practice, the knob and a hinge of a door would be removed and the elongate member 315 would be aligned with the opening in the door that receives the knob. Then a hole would be drilled in a generally widthwise direction from the knob area to the hinge mounting area. Then wiring for carrying security signals could be placed in the hole.

The embodiment of the present invention shown in FIGS. 11A-C are substantially similar to that of the previous embodiments discussed above with the exception of the rotatable drill bit guide 324. The rotatable bit guide 324 is shown extending transversely from the elongate member 315 and in operation is positioned in alignment with the thickness aspect of a door. The rotatable drill bit guide 324 comprises an axis of rotation 330 coupling a first end 334 of the drill bit guide to the elongate member 315. The rotatable drill bit guide 324 further comprises an adjustment mechanism 332 coupled between a second end 336 of the rotatable drill bit guide 324 and the elongate member 315, wherein the rotatable drill bit guide 324 rotates about the axis of rotation 330 in response to actuation of the adjustment mechanism 332. In particular embodiments, the adjustment mechanism 332 is a bolt, wherein the adjustment mechanism 332 is actuated in response to rotation of the bolt. The rotation of the adjustment mechanism 332 in each direction corresponds to a direction rotation of the rotatable drill bit guide 324. This occurs as the rotation of the adjustment mechanism moves the second end 336 toward and away from the elongate member 315. The rotatable drill bit guide 324 is rotated through a predetermined range of rotation depicted as angle 337, wherein the range of rotation is determined by the adjustment mechanism 332. The rotation of the drill bit guide 324 results in the change of angle 337 between the drill bit guide 324 and the elongate member 315. This allows the drill bit to enter the door at a user defined angle 337 in order to account for deflection of the drill bit as it travels through the door, thereby allowing the drill bit to exit the door dead center on the other side and to further prevent inadvertent damage to the faces of the door.

While shown that the first end 334 includes the axis of rotation 330 and the adjustment mechanism 332 is coupled to the second end 336, it will be understood that the positions of the axis of rotation 330 and the adjustment mechanism 332 may be flipped, wherein the axis of rotation is coupled to the second end 336 and the adjustment mechanism 332 is coupled to the first end 334. In this embodiment, the adjustments described above for the first end 334 and second end 336 would also be flipped during operation of the drill bit jig 312.

The rotatable drill bit guide 324 includes through openings 327 and 328 that form part of the bit guide 324 and have longitudinal axes that are aligned to a longitudinal axis of the elongate member 315. Thus, when a bit is guided through one of the openings 327 and 328 in the rotatable drill bit guide 324 and drilled through a door, the bit can remain aligned and avoid damage or ruin to the door by the bit coming out through the front or rear face of the door in a thickness direction. Depending on the core material of the door, such as a wood core, a mineral core, a steel core and the like, the drill bit may deflect a certain amount and result in a the drill existing off dead center, or further exiting the door through the front or rear face of the door. This deflection is often caused by the inability of the drill bit to transfer all of the shaving of the door material out of the hole being drilled. The rotatable drill bit guide 324, is rotatable to account for such deflection to ensure that the drill bit exits the door in a predictable manner and without unnecessary damage to the door.

The jig 312 may further include notches 356. One function of the notches 356 is to allow a user to clean out debris and other material resulting from the drilling process to reduce wear on drill bit guide 324.

Further, the jig 312 may further include bushings 350 and 352 that are inserted within the through openings 327 and 328 respectively. The bushings or liners 350 and 352 protect the through holes 327 and 328 against premature wear. Also, the bushings 350 and 352 may advantageously provide reduced friction between the bits and the jig 312 during drilling.

As the bushings 350 and 352 wear, they need to be replaced. In order to replace the bushings 350 and 352, a user uses a bushing driver 354 that may inserted within the through openings 327 and 328 by use of notches 356. A force by use of a driver may be applied to the bushing driver 354 in order to extract and push the bushings 350 and 352 out. During times of non-use, the bushing drivers 354 are stored within bushing driver retainers 360. The bushing driver retainers 360 may be coupled within the drill bit guide 324 proximate an end of the drill bit guide 324. The bushing driver retainers 360 receive the bushing drivers 354 and retain them within the bushing driver retainers 360 by use of set screws 362 that are moveable between an engaged and disengaged position, wherein the engaged position is one wherein the set screws 362 contact the bushing drivers 354 and the disengaged position is when the set screws 362 do not contact the bushing drivers 354. When the set screws 362 are moved from the engaged to the disengaged position, the bushing drivers 354 can be removed. According to particular embodiments, an allen wrench or other type of elongate tool is inserted within slots 363 and is slid along the slot by applied force from a user, wherein the allen wrench pushed the bushing drivers 354 out of the bushing driver retainers 360.

The jig 312 may further include bushing retainers 364 for receiving the bushings 350 and 352. The bushing retainers 364 are coupled within the elongate member 315 proximate and end of the elongate member 315. The bushings are held within the bushing retainers 364 by use a retaining member 366. In particular embodiments, the retaining member 366 overlaps each of the bushing retainers 364 in order to prevent accidental sliding out of the bushings 350 and 352. The retaining member 366 is held in place by use of a bolt, wherein to engage and disengage the retaining member 366 from bushing retainers 364, the bolt may be inserted or removed respectively. Disengaging the retaining member 366, allows the user to remove the bushings 350 and 352.

Further, the drill bit jig may include drill bit retainers 374 coupled within the elongate members 315 proximate end and extending substantially the entire length of the elongate member 315 for receiving drill bits 376. Further, the drill bit jig 312 may further include a starter bit retainer 370 to releasably retain a starter bit 372 for starting the drilling process. A locking mechanism 378, such as, but not limited to, a snap pin may be used to retain the drill bits 376 and start bit 372 within their respective retainers.

Additionally, embodiments of the present invention may also include an attachment guide 380, wherein the attachment guide comprises through holes 382 and 384 having bushings 386 and 388. The attachment guide 380 is removably coupled to the rotatable drill bit guide 324 in order to allow a user to drill through the center of a door that is wide. The attachment guide 380 may be coupled by use of bolts to the drill bit guide 324.

Another embodiment of the present invention includes a method of using the jig 312 to drill a hole in a widthwise direction through a door. The method includes the steps of selecting a drill bit and removing the drill bit from within the elongate member 315 of the jig 312; aligning the jig 312 with a desired line of drilling; mounting the jig to the door; rotating the rotatable drill bit guide 324 to account for deflection of the drill bit through the work piece; drilling the hole along the desired line of drilling using the drill bit; and removing the jig from the work piece. The step of securing the jig 312 to the door includes inserting the jig securing elements into through holes in the elongate member 315 and turning a clamping knob in a tightening direction so that the jig 312 is clampingly secured to the door. Then, the drill bit is inserted through one of the holes 327 and 328 in the bit guide 324. The step of removing the jig 312 from the door further includes turning the clamping knobs of the jig securing elements in a loosening direction and removing the jig securing elements from the through holes in the elongate member 315. Finally, the drill bit is placed within the elongate member 315 of the jig 312 for storage.

Figure 12:
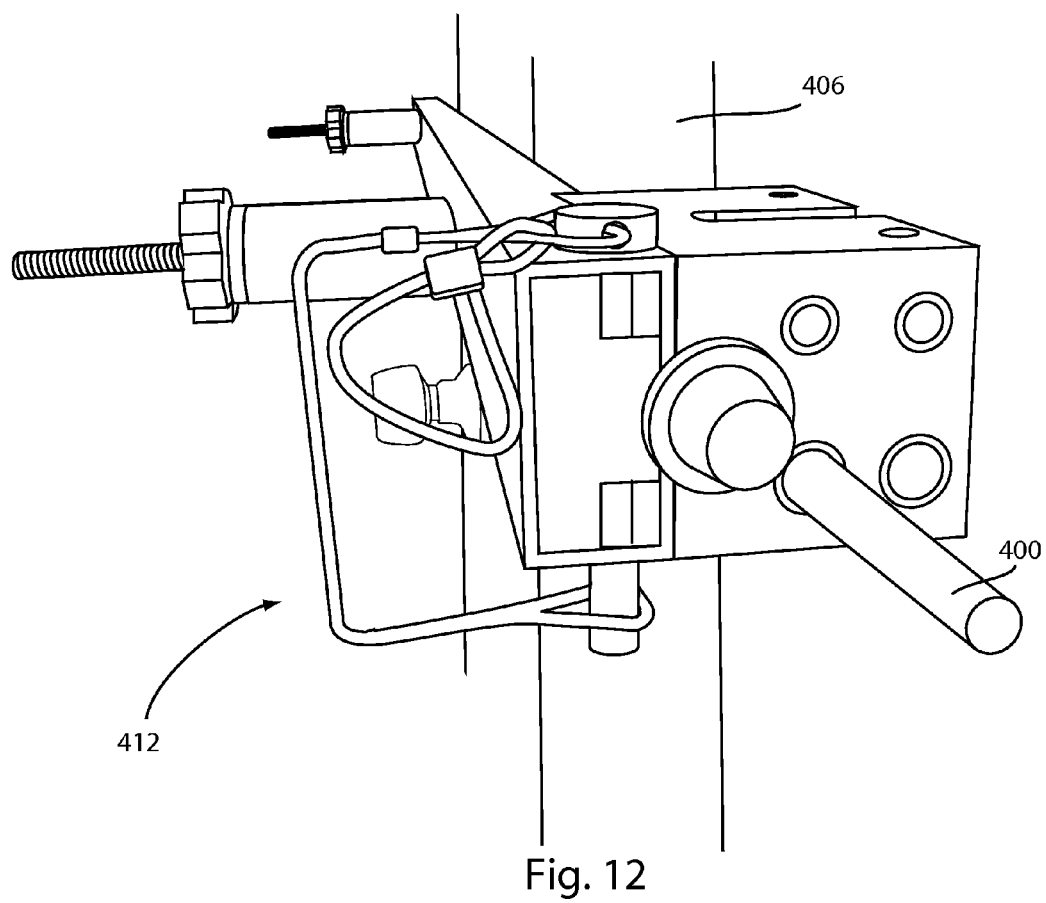
FIG. 12 is a perspective view a drill bit jig for use on hollow metal doors.
Figure 13:
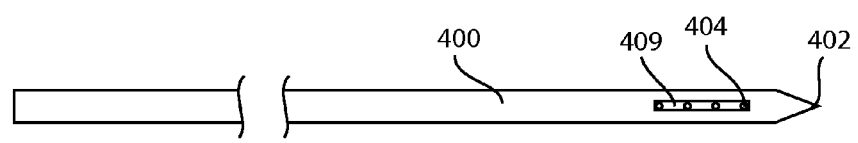
FIG. 13 is a side view of a hollow metal door bit.
Figure 14:
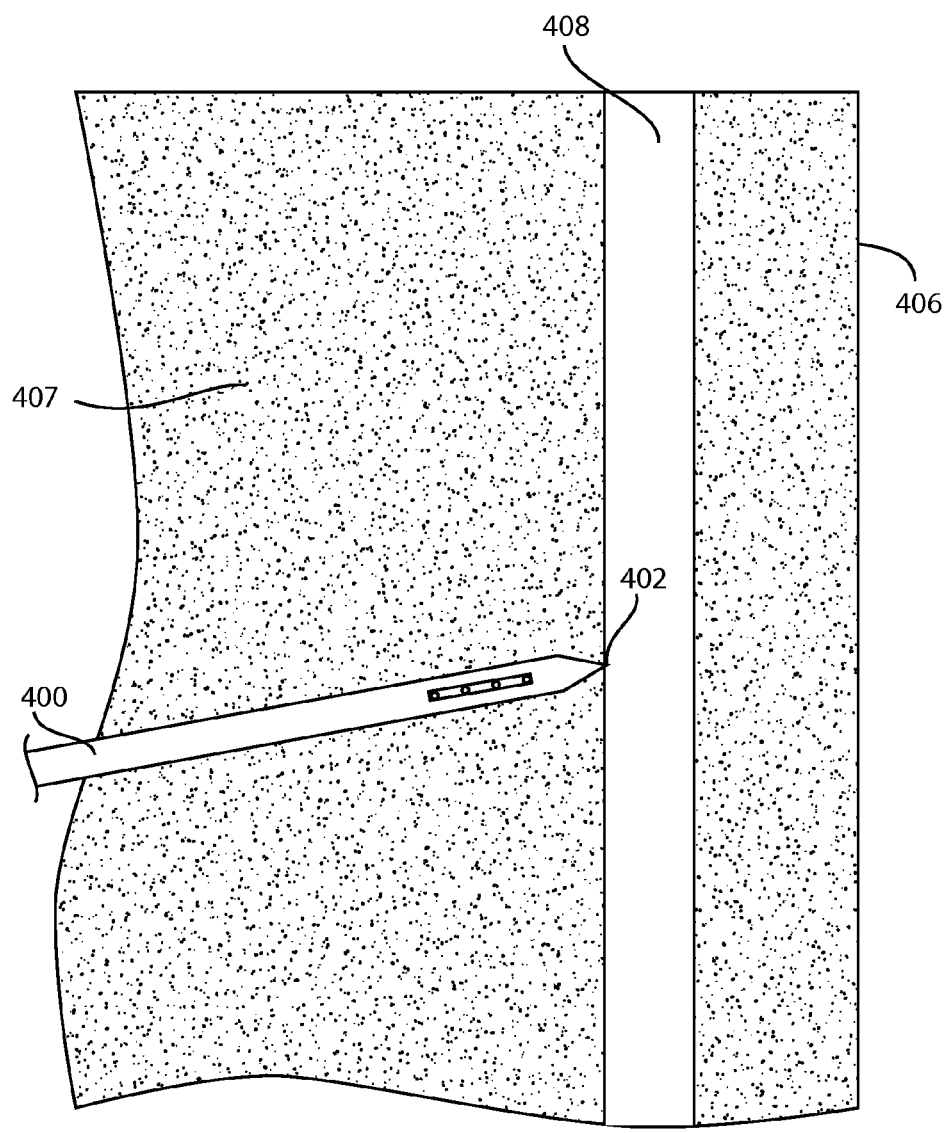
FIG. 14 is a side view hollow metal door bit operating within a hollow metal door.

Referring to FIGS. 12-14, an additional embodiment of the present invention may include a drill bit jig 412 for drilling into and coring hollow metal doors. The drill bit jig 412 may include similar features as jig 12 or jig 312, and accordingly, the elements and components of jig 12 and jig 312 may be incorporated into jig 412. The jig 412 may be used with a drill bit to drill through an outer edge of the metal door 406. The drill bit jig 412 further includes a hollow metal door bit 400. Once a hole is created through an edge of the metal door 406, the hollow metal door bit 400 may then be used to extend through the hole and drill through filler material 407. The hollow metal door bit 400 extends through the filler material 407 with minimal bending. The filler material 407 may be foam, cardboard, combinations of foam and cardboard or other type of material that functions as filler material 407. In some instances, metal door 406 does not have any filler material 407.

The hollow metal door bit 400 comprises a bit tip 402. The bit tip 402 allows the hollow metal door bit 400 to drill through the filler material 407 without the need to expel shaving of the filler material 407 being drilled out of the door 406. Conventional means for drilling create significant debris from shavings of filler material 407. This is avoided by use of hollow metal door bit 400.

Some hollow metal doors 406 include metal splines 408 that extend the length of the door 406 and also extend the depth of the door 406. These splines 408 serve to provide structural strength to the door 406. These splines require drilling through during a coring process of a hollow metal door. Drilling through the spline 408 allows the running of wire through the hole drilled through the door 406. Without the ability to drill through the splines 408, the coring process would not be completed. In instances with doors 406 with splines 408, the bit tip 402 of the hollow metal door bit 400 has a second function. In addition to allowing for drilling through filler material 407, the bit tip 402 can serve as a starter bit. The hollow metal door bit 400 has a tip that initially engages a spline 408 within the metal door 406. The tip 402 comprises a point, wherein a user may apply blunt force to an end of the bit 400 opposing the tip 402. This blunt force results in the tip 402 punching partially into and/or through the spline 408 to create a starter hole. The hollow metal door bit 400 may then be extracted back out of the door 406 and a conventional drilling bit inserted into the door through the same hole drilled by the hollow metal door bit 400. The conventional drill bit then engages the starter hole, thereby allowing the drill bit to drill through the spline 408 with greater ease.

The hollow metal door bit 400 acting as a starter bit is even more critical when drilling at an angle, which is the most common type of drilling during a coring process of a door. A conventional drill bit would deflect causing bending once it engaged a spline 408 at an angle. This often results in breakage of the drill bit and damage to the door 406. The hollow metal door bit 400 prevents deflection of the drill bit by creating a hole that the drill bit engages.

The hollow metal door bit 400 may further comprise one or more extraction holes 404. The extraction holes 404 may be used to receive a wire or other type of line. The user may then extract the hollow metal door bit 400 from the hole in the door created by the bit 400 and thereby pulling the wire through the hole that was formed by the bit 400. In at least this manner the hollow metal door bit 400 is extracted and the wire pulled through the hole. Further, there is a notch 409 engaging each of the holes 404 on opposing sides of the shaft of the hollow metal door bit 400. The notch 409 on each side allows for the wire to be adjusted and placed within the notch 404 in order to prevent shearing of the wire during extraction of the metal door bit 400.

Having a plurality of holes 404 in the hollow metal door bit 400 provides extended use of the hollow metal door bit 400. The bit tip 402 of the hollow metal door bit 400 may become dull after several uses. The tip may be sharpened, such as by use of a grinder for example. Sharpening the tip 402 of the hollow metal door bit 400 results in removing material from the tip to create a sharpened point. As more and more material is removed during several sharpening processes, the tip 402 will eventually engulf the furthermost hole 404, whereupon a user may then use the next successive hole down the shaft of the hollow metal door bit 400.

This process of using the hollow metal door bit 400 to drill through filler material 407 and create a starter hole in the spline 408 may be repeated for as many splines 408 that are within the door 406. Also on the opposing end of the door 406, the hollow metal door bit 400 may be used to create a starter hole. Again this is more critical when drilling at an angle.

Figure 15A:
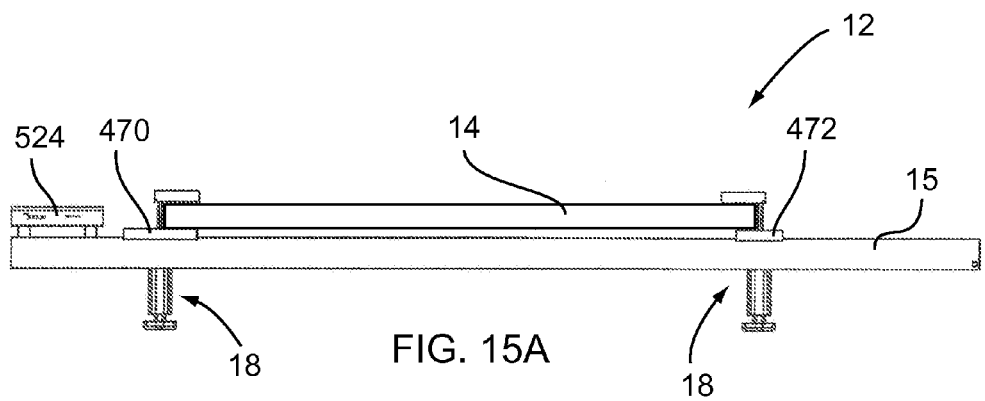
FIG. 15A is a top view of a drill bit jig.
Figures 15B, 15C:
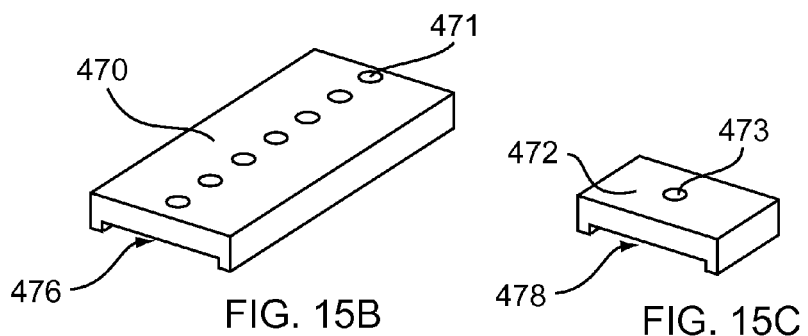
FIG. 15B is a perspective view of a first pad of a drill bit jig.
FIG. 15C is a perspective view of a second pad of a drill bit jig.

Referring again to the drawings, FIG. 15A-15C depict a drill bit jig system 12 comprising an elongate member 15, a drill bit 66, two jig securing elements 18 coupled to the elongate member 15 for securing the elongate member 15 to a door 14, a drill bit guide 524 having a hole 30 or 29 or 450 for receiving the drill bit 66, and a first and second pad 470 and 472 respectively. The drill bit guide 524 may be fixed or rotatable as described in various drill bit guides previously discussed in this disclosure. The first pad 470 includes a plurality of apertures 471 and a channel 476. The first pad 470 is held in a single position and removably coupled to a portion of the elongate member 15. The apertures 471 correspond to apertures in the elongate member 15. A jig securing element 18 extends through the aperture 471. The second pad 472 includes a plurality of apertures 473 and a channel 478. The second pad 472 is slideable and removably coupled to a portion of the elongate member 15. The apertures 473 correspond to apertures in the elongate member 15. A jig securing element 18 extends through the aperture 473.

The first and second pads 470 and 472 operate to allow the drill bit jig 12 to affix to a door 14 even if the door 14 is warped. The pads create a space between the elongate member 15 and the door 14. Further if the door 14 has any decorative features on the face, such as the glass, the pads 470 and 472 serve to create a space and not damage the decorative feature. Further still, the pads 470 and 472 are removably to allow for the indexing of the bit deeper in the thickness of a door, particularly on custom doors that have a larger thickness than typical doors.

Figure 17A:
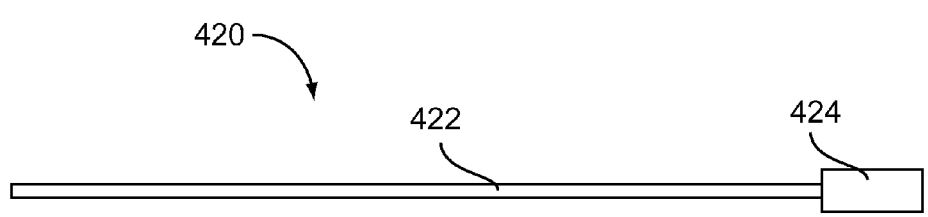
FIG. 17A is a side view of a core check.
Figure 19A:
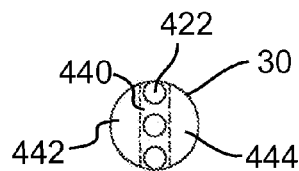
FIGS. 19A-19C are end views of a hole of a drill bit guide of a drill bit jig system with a core check in operation.
Figure 19B:
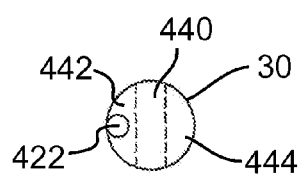
Figure 19C:
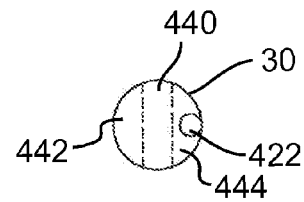
Figure 18:
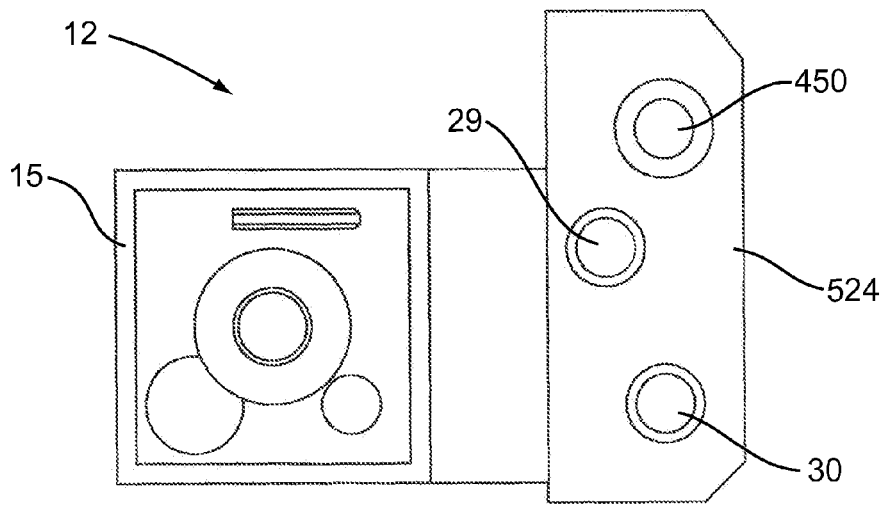
FIG. 18 is an end view of a drill bit jig system.

Referring again to the drawings, FIGS. 17-19 depict a drill bit jig system 12 comprising an elongate member 15, a drill bit 66, two jig securing elements 18 coupled to the elongate member 15 for securing the elongate member 15 to a door 14, a drill bit guide 524 having a hole 30 or 29 or 450 for receiving the drill bit 66, and a core check 420 comprising a shaft body 422 and a probe 424 coupled to an end of the body shaft 422. The core check 420 indicates whether a hole being drilled through the door 14 by the drill bit 66 is straight in response to operating the core check 420. The probe 424 of the core check 420 comprises a diameter that is substantially the same diameter as the drill bit 66. The shaft body 422 of the core check 420 comprises a diameter is smaller than the diameter of the probe 424.

As shown in the drawings, an end of the body shaft 422 opposite of the probe 424 remains substantially in a middle section 440 of the hole 30 in the drill bit guide 524 (FIG. 17C and FIG. 19A) or moves to a first or second side section 442 or 444 (FIG. 17B, FIG. 17D, FIG. 19B, and FIG. 19C) respectively during operation of the core check 420 by inserting the core check 420 through the hole 30 of the drill bit guide 524 and into a hole in the door 14 formed by the drill bit 66. The probe 424 of the core check 420 is directed toward a face 430 or 432 of the door if the end of the body shaft 422 opposite of the probe 424 moves to one of the first or second side sections 442 or 444. The core check 420 indicates the hole being drilled by the drill bit 66 is directed toward a face of the door 430 or 432 in response to the end of the body shaft 422 opposite of the probe 424 moving to one of the first or second side sections 442 or 444. If the end of the body shaft 422 opposite of the probe 424 remains in the middle section 440, the core check 420 indicates the hole is straight.

Figure 16:
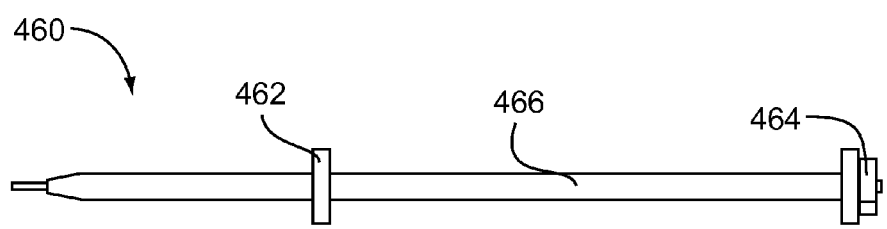
FIG. 16 is a side view of a mortise bit.

Referring to FIGS. 16 and 18, the drill bit guide 524 may further include a mortise hole 450 for use with a mortise bit 460. The mortise bit 460 includes a shaft body 466 that extends through the mortise hole 450. The mortise bit 460 also includes a cutting tip 464 and a collar 462. The collar 462 is removably coupled to the shaft body 466. In operation, the shaft body is inserted through the mortise hole 450 of the bit guide 24, and the collar 462 is removably secured to the shaft body 466. The collar 462 operates to limit the range of travel of the mortise bit 460 through the mortise hole 450 by engaging a side of the bit guide 524 to prevent further travel. This allows a user to set the depth of the cut to be made by the mortise bit 460.

It is to be understood that the bit sizes that may be used with the present invention are limitless. In a broad range the bit sizes may include sizes from one thirty-second of an inch to one and a half inches in diameter. In another range the bit sizes may range from one eighth to one inch in diameter. In still another range, the bit sizes may range from three sixteenths to three fourths of an inch in diameter. In still another range the bit sizes may range from one quarter inch to one half inch in diameter. Sizes of one quarter inch, five sixteenths inch, and three eighths inch are standard bit sizes that may be used in conjunction with the present invention. The through openings of the bit guide may be made to accommodate these sizes and any size within the ranges set forth above. The through opening diameters may be made to accommodate predetermined sizes within these ranges with or without liners or bushings.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A drill bit jig system comprising:
   an elongate member;
   at least one drill bit;
   two jig securing elements, each jig securing element comprising an L-shaped bolt wherein a straight portion of the L-shaped bolt is encased in a door protecting material;
   a drill bit guide; and
   a guide line inscribed onto the elongate member, wherein the drill bit guide guides a drill bit through the work piece along the guide line during drilling.

2. The system of claim 1, wherein the door protecting material is configured to fit within a space between a hinged side of a door and a door jamb.

3. The system of claim 2, wherein a width of the door protecting material is smaller than the space between the hinged side of the door and the door jamb.

4. The system of claim 1, further comprising a plurality of through holes in the drill bit guide extending lengthwise in a direction generally parallel to the longitudinal axis of the elongate member.

5. The system of claim 4, wherein at least two of the plurality of through holes in the drill bit guide have a diameter different from each other.

6. The system of claim 5, wherein the second jig securing element is adjustable by being receivable in any one of the plurality of through holes.

7. The system of claim 1, further comprising a through hole in a first end of the elongate member for receiving the first jig securing element and a plurality of through holes in a second end of the elongate member.

8. A drill bit jig system comprising:
   an elongate member;
   a drill bit;
   two jig securing elements coupled to the elongate member for securing the elongate member to a door;
   a drill bit guide having a hole for receiving the drill bit; and
   a core check comprising a shaft body and a probe coupled to an end of the body shaft, the probe of the core check comprising a diameter that is substantially the same diameter as the drill bit and the shaft body of the core check comprises a diameter is smaller than the diameter of the probe, wherein the core check indicates whether a hole being drilled through the door by the drill bit is straight in response to inserting the core check through the hole of the drill bit guide and into the hole being drilled through the door, wherein an end of the body shaft opposite of the probe remains substantially in a middle section of the hole in the drill bit guide or moves to a first or second side of the hole in the drill bit guide during operation of the core check.

9. The system of claim 8, wherein the probe of the core check is directed toward a face of the door if the end of the body shaft opposite of the probe moves to one of the first or second side sections.

10. The system of claim 9, wherein the core check indicates the hole being drilled by the drill bit is directed toward a face of the door in response to the end of the body shaft opposite of the probe moving to one of the first or second side sections.

* * * * *